(12) United States Patent
Stone

(10) Patent No.: US 8,171,691 B1
(45) Date of Patent: May 8, 2012

(54) FLOOR MEMBER WITH CORK SUBSTRATE

(75) Inventor: Norman Stone, Harrison, NY (US)

(73) Assignee: Tower IPCO Company Limited, Dublin (IE)

( * ) Notice: Subject to any disclaimer, the term of this patent is extended or adjusted under 35 U.S.C. 154(b) by 0 days.

(21) Appl. No.: 13/039,408

(22) Filed: Mar. 3, 2011

(51) Int. Cl.
- *E04B 2/08* (2006.01)
- *E04B 2/18* (2006.01)
- *E04B 2/32* (2006.01)
- *E04B 2/46* (2006.01)

(52) U.S. Cl. ............ 52/591.4; 52/609; 52/611; 52/451; 52/462; 428/60; 428/47; 428/189

(58) Field of Classification Search ............... 52/591.4, 52/403.1, 391, 392, 451, 454, 462; 428/40.1, 428/42.3, 40.4, 60, 54, 157
See application file for complete search history.

(56) References Cited

U.S. PATENT DOCUMENTS

| | | | |
|---|---|---|---|
| 7,155,871 B1 * | 1/2007 | Stone et al. | 52/591.4 |
| 7,322,159 B2 * | 1/2008 | Stone et al. | 52/741.3 |
| 7,458,191 B2 * | 12/2008 | Stone | 52/591.4 |
| 7,685,790 B2 * | 3/2010 | Stone | 52/591.4 |
| 2010/0313511 A1 * | 12/2010 | Thiers | 52/506.01 |
| 2010/0319282 A1 * | 12/2010 | Ruland | 52/309.3 |

* cited by examiner

Primary Examiner — Mark Wendell
(74) Attorney, Agent, or Firm — Rodman & Rodman

(57) ABSTRACT

The floor member is a laminated structure of flexible compressible cork sheet material and flexible plastic sheet material in the form of a floor tile or a floor plank. The cork sheet material and plastic sheet material are offset, from each other and have respective predetermined thicknesses to enable the floor member to be bendable to facilitate assembly of a plurality of the floor members into a floor covering. The compressible cork sheet material provides sound and heat insulation and the flexible plastic sheet material is yieldable to surface irregularities of a floor base. The cork sheet material is sandwiched between two layers of clear plastic material to provide a distinct sight of the structural presence and thickness of the cork sheet at an edge of the floor member.

19 Claims, 3 Drawing Sheets

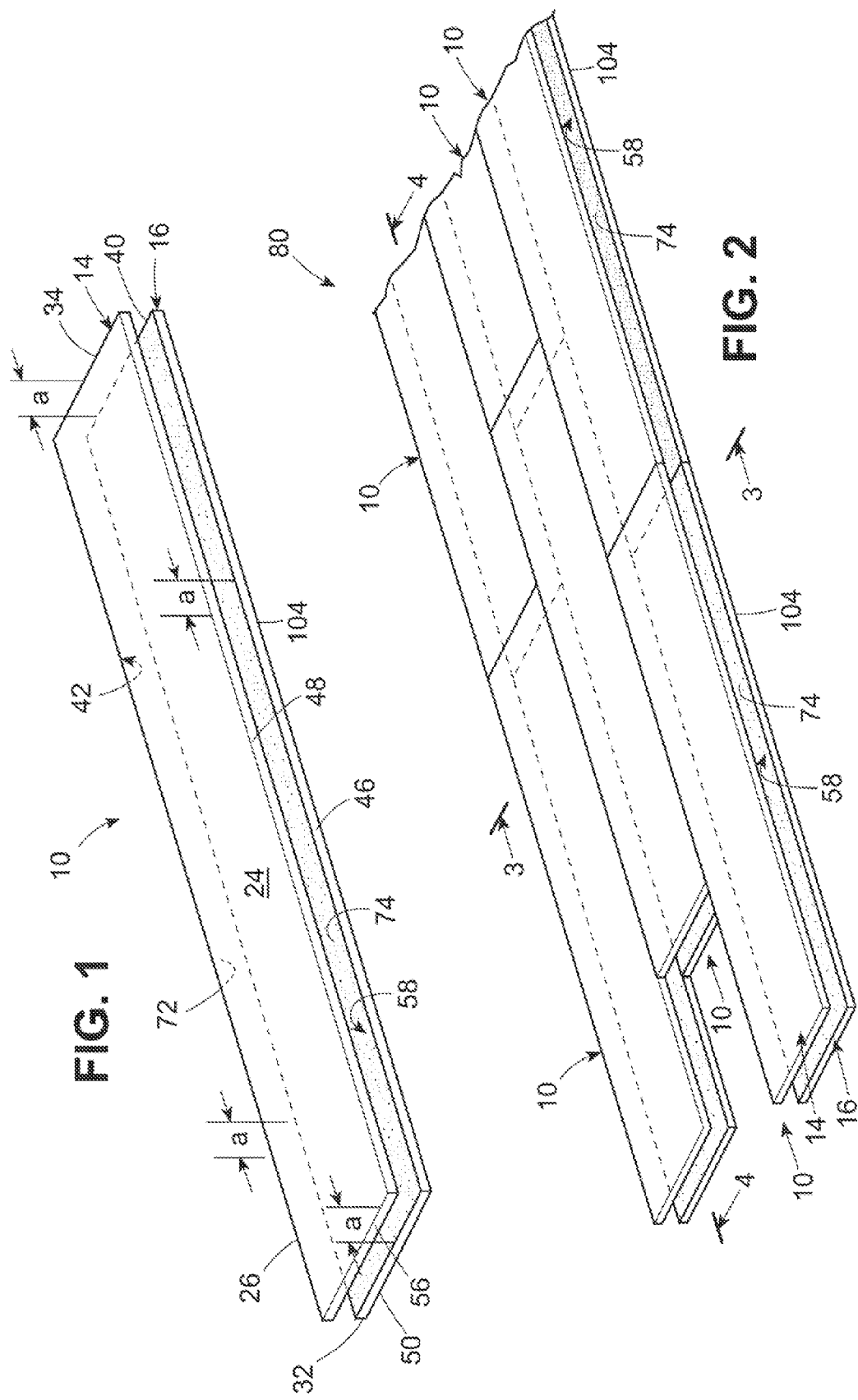

FLOOR MEMBER WITH CORK SUBSTRATE

BACKGROUND OF THE INVENTION

Field of the Invention

This invention relates to floor members that can be installed directly onto a floor base without being bonded to the floor base, and more particularly, to a novel compressible floor member with a durable floor surface, good sound insulation, good heat insulation and having a relatively soft, yieldable walking surface.

As used herein, the term "floor member" is intended to refer to laminated floor planks and laminated floor tiles. However for purposes of simplifying the description of the invention the detailed description will generally refer to floor planks, unless otherwise indicated. Nevertheless, the invention also encompasses floor tiles. Thus the concepts and structures described in connection with the term "floor plank" are also applicable to floor tiles.

DESCRIPTION OF THE DRAWINGS

In the accompanying drawings,

FIG. 1 is a perspective view of a floor member incorporating one embodiment of the present invention in the form of a floor plank;

FIG. 2 is a perspective view of an assembly pattern thereof;

Corresponding reference numbers indicate corresponding parts throughout the several views of the drawings.

DETAILED DESCRIPTION OF THE INVENTION

Figure 3:
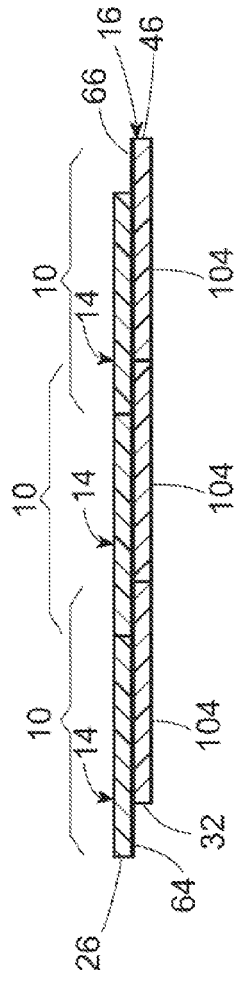
FIG. 3 is a sectional view taken on the line 3-3 of FIG. 2.
Figure 4:
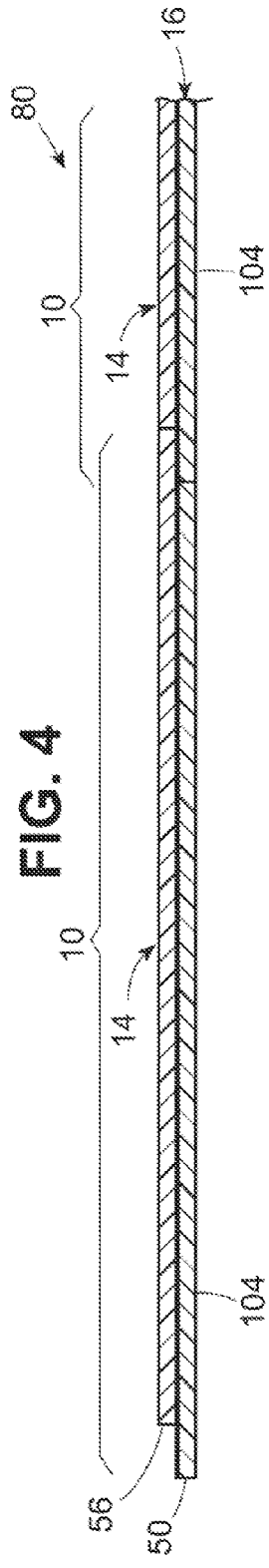
FIG. 4 is a sectional view taken on the line 4-4 of FIG. 2.

Referring to the drawings, one embodiment of the floor member of this invention is in the form of a floor plank such as shown in FIG. 1 and generally indicated by the reference number 10.

The floor plank 10 includes a first floor member portion 14 and a second floor member portion 16 that are of identical size and shape. In a preferred embodiment of the invention the first floor member portion 14 is laminated to the second floor member portion 16 such that the first floor member portion 14 has a predetermined offset from the second floor member portion 16 in the manner described in my U.S. Pat. Nos. 7,155,871, 7,322,159, and 7,458,191, the disclosures of which are hereby incorporated by reference in this application.

In the offset arrangement of the first and second floor member portions 14 and 16, a side edge 26 (FIG. 1) of the first floor member portion 14 extends an offset amount "a" beyond a corresponding side edge 32 of the second floor member portion 16. Another side edge 34 of the first floor member portion 14, perpendicular to the' side edge 26, extends the same offset amount "a" beyond a corresponding side edge 40 of the second floor member portion 16. The offsets at the side edges 26 and 34 thus define an offset L-shaped marginal section 42 (FIG. 1) of the first floor member portion 14.

Also in the offset arrangement of the first and second floor member portions 14 and 16, a side edge 46 (FIG. 1) of the second floor member portion 16 extends the offset amount "a" beyond a corresponding side edge 48 of the first floor member portion 14. Another side edge 50 of the second floor member portion 16, perpendicular to the side edge 46, extends the offset amount "a" beyond a corresponding side edge 56 of the first floor member portion 14. The offsets at the side edges 46 and 50 define an offset L-shaped marginal section 58 (FIG. 1) of the second floor member portion 16.

The L-shaped marginal section 42 of the first floor member portion 14 and the L-shaped marginal section 58 of the second floor member portion 16 are of identical size and shape.

A suitable bonding or adhesive composition for laminating the first floor member portion 14 and second floor member portion 16 together has the following components, the amounts of which are approximate:
  a) 35% SIS (styrene-isoprene-styrene elastomer)
  b) 54.5% petroleum resin
  c) 10% mineral oil
  d) 0.05% oxidation resistant BHT (2,6-di-tert-butyl-p-cresol)

The bonding material for laminating the first and second floor member portions 14 and 16 together can be provided on either the lower surface 64 of the first floor member portion 14 or the upper surface 66 of the second floor member portion 16. Under this arrangement only one of the L-shaped marginal sections 42 or 58 is provided with adhesive.

However, the bonding material for the first and second floor member portions 14 and 16 is preferably provided on a lower surface 64 (FIG. 3) of the first floor member portion 14 and on an upper surface 66 of the second floor member portion 16.

The L-shaped marginal section 42 has a downwardly directed adhesive surface 72 (FIG. 1) that is part of the lower surface 64 (FIG. 3) of the first floor member portion 14 and the L-shaped marginal section 58 has an upwardly directed adhesive surface 74 (FIG. 1) that is part of the upper surface 66 (FIG. 3) of the second floor member portion 16. The adhesive on the exposed adhesive surfaces 72 and 74 is the bonding material used for laminating the first floor member portion 14 and the second floor member portion 16 together.

Although the dimensions of the floor plank 10 are a matter of choice, a suitable size for the first floor member portion 14 and the second floor member portion 16 can be, for example, 6 inches by 48 inches. Smaller or larger size floor planks are a matter of choice.

The thickness of the first floor member portion 14 can be, for example, approximately 2.0 mm and the thickness of the second floor member portion 16 can be, for example, approximately 2.5 mm. The marginal offset "a" can be, for example, approximately 1 inch. The amount of offset is a matter of choice, and larger or smaller offsets are also usable.

Figure 5:
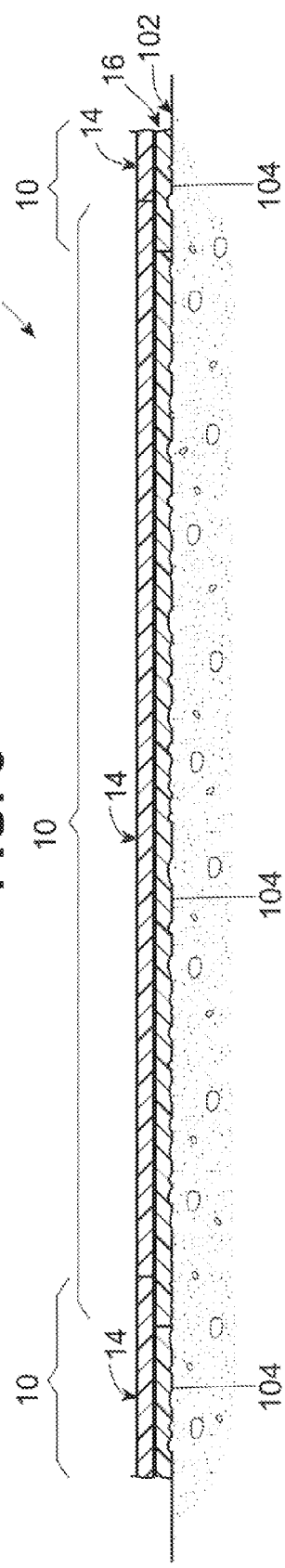
FIG. 5 is a sectional view thereof on a floor base.

As indicated in FIG. 5, the second floor member portion 16 of the floor plank 10 is yieldable to small bumps and other imperfections in a floor base 102, generally referred to as surface irregularities. The second floor member portion 16 thus enables the floor plank 10 to conform to such surface irregularities and lie flat on the floor base 102.

During installation of the floor planks 10 in side-by-side and end-to-end relationship, as shown in the floor plank assembly pattern 80 of FIG. 2, the downwardly directed adhesive surface 72 (FIG. 1) of the L-shaped marginal section 42 of the first floor member portion 14 is positioned to engage the upwardly directed adhesive surface 74 of the L-shaped marginal section 58 of the second floor member portion 16 to form the assembly 80 of the floor planks 10.

When placing two of the planks 10 together, one of the planks 10 can be angled at approximately 45 degrees (not shown) with respect to the floor base 102 and onto the corresponding upwardly facing adhesive surface 74 (FIG. 1) of an adjacent floor plank 10.

The thickness of the first and second floor member portions 14 and 16 enable the floor plank 10 to be bendable, when desired, with a predetermined convex bend or a predetermined concave bend to facilitate assembly of a plurality of the floor planks 10 into the floor plank assembly pattern 80 (FIG. 2).

The floor plank assembly pattern 80 (FIG. 2) is but one example of numerous possible plank patterns known in the art.

The floor planks 10 can be installed on the floor base 102 (FIG. 5) without any mastic or adhesive coating on the floor base 102, and without mastic or adhesive on an undersurface 104 (FIGS. 1-3) of the second floor member portion 16. Thus during installation, the floor planks 10 can be placed on a dry floor base surface 102 for easy shifting to any selected position, thereby facilitating installation of the floor planks 10 in any desired pattern.

Preferably the installation of floor planks 10 should start in a corner of a room (not shown) and proceed outwardly therefrom. An expansion gap of ⅛ inch or less, for example, from each wall is generally suitable for most installations. The expansion gap is usually covered by molding.

The first floor member portion 14 and the second floor member portion 16 of the floor plank 10 are provided with an overall thickness that enables the floor plank 10 to be easily cut with a utility knife, if trimming is needed. Ease of trimming the floor plank 10 and the mastic free placement of the planks 10 on a floor base 102 make it convenient for a do-it-yourselfer to install the floor planks 10.

Figure 6:
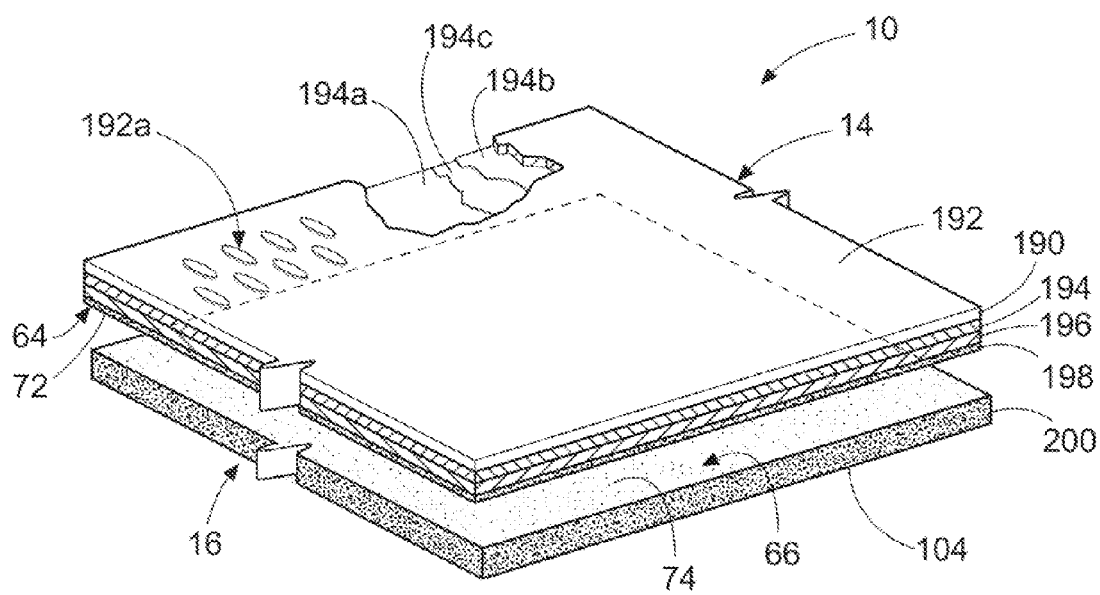
FIG. 6 is an enlarged fragmentary perspective view thereof showing the laminate sections of the floor plank.

FIG. 6 shows a preferred laminate configuration of the floor plank 10. The first floor member portion 14 of the floor plank includes an upper laminate section 190 formed of clear, semi-rigid transparent plastic material, which can be a polyvinyl chloride (pvc) or a non polyvinyl chloride polyolefin equivalent. The upper laminate section 190 has a top surface 192 that is preferably embossed in any suitable known manner to provide a relief pattern, such as the pattern shown schematically at 192a in FIG. 6. It has been found that the relief pattern 192a enhances the durability and wearability of the floor plank 10, and helps the floor plank 10 to withstand the impact of narrow heel bottoms that are typical of high heel footwear.

The embossment and relief pattern 192a provides the floor plank 10 with beauty and visual interest and is but one example of numerous possible embossment patterns, including wood grain patterns.

The upper laminate section 190 has a thickness of approximately 0.25 to 0.75 millimeters and is preferably 0.50 millimeters thick. The upper laminate section 190 is laminated onto a cork laminate section 194.

The cork laminate section 194 incorporates a composite cork material made of natural cork that is ground in a known manner into a homogeneous particulate form. The cork laminate section 194 preferably has a laminate density of approximately 500 to 600 kilograms per cubic meter. The density range of 500 to 600 kilograms per cubic meter has been found to be an optimum density range for the floor plank 10 because it is durable while also providing other desirable properties of softness, and heat and sound insulation.

The cork laminate section 194 has a thickness of approximately 2.5 to 4.0 millimeters and a preferred thickness of 3 millimeters. The cork laminate section 194 also has an approximate weight of 1.50 to 1.80 kilograms per square meter and a preferred weight of 1.65 kilograms per square meter.

The thickness and density of the cork laminate section 194 renders the cork laminate section 194 sufficiently compressible to enable the floor plank 10 to have a softness that can be sensed when the floor plank is walked upon. The thickness and density of the cork laminate section 194 also enables the floor plank 10 to have good heat and sound insulation, thereby providing a warm, comfortable floor covering.

The compressible cork laminate section 194 is thus incorporated in the first floor member portion 14 and helps the floor plank 10 to absorb sound imposed on a surface of the floor plank 10. For example footwear impact noise that occurs when the floor plank 10 is walked upon and noise: that occurs when objects are moved on the floor plank 10 are muffled or absorbed by the compressible cork laminate section 194 such that there is, little or no amplification of footwear impact noise.

The cork laminate section 194 thus enables the floor plank 10 to absorb a substantial amount of footwear impact noise and object movement noise when the floor planks 10 are walked upon, and when objects are moved thereon.

An upper surface 194a of the cork laminate section 194 is generally of a light beige color onto which a design pattern can be printed. If desired the upper surface 194a of the cork laminate section 194 can be whitewashed in any suitable known manner and the design pattern printed directly onto the whitewashed surface.

Another option is to print the design pattern on a flexible substrate 194b, such as printable flexible pvc, before or after it is adhered to the upper surface 194a of the cork laminate section 194. The flexible substrate 194b can have a thickness of approximately 0.10 to 0.25 millimeters.

Preferably a double layer of pvc substrate, which includes the layer 194b and a layer 194c, similar to the layer 194b, is provided on the upper surface of the cork layer 194. The double flexible substrate layers 194b and 194c help keep the texture at the surface of the cork layer 194 from dimpling through or telescoping through to the upper laminate section 190.

The cork laminate section 194 is laminated in any suitable known manner onto a balance sheet or balance layer laminate section 196 of pvc, having a thickness of approximately 0.1 to 1.0 millimeters. The balance layer laminate section 196 provides dimensional stability to the floor plank 10 by minimizing the effect of different coefficients of expansion of different materials that are laminated above and below the balance layer laminate section 196. The balance layer laminate section 196 thus helps inhibit curving, cupping or arching of the floor plank 10.

When the balance layer laminate section 196 is in the thickness range of 0.1 to 0.5 millimeters it is preferably formed of a clear pvc. When the balance layer laminate section 196 is in the thickness range greater than 0.5 millimeters to 1.0 millimeters it is preferably formed of a dark colored pvc, such as black pvc.

Under this arrangement the upper and lower boundaries of the cork laminate section 194 are visually apparent to a consumer, or anyone examining an edge portion of the floor plank 10, because the cork laminate section 194 is sandwiched between two layers of distinctive material, namely the clear upper laminate section 190 and the clear or dark balance layer laminate section 196.

The thickness of the cork laminate section 194 is thus easily distinguishable to an observer, from the other layers of the floor plank, even though the cork laminate section 194 is sandwiched between other layers of the floor plank. The distinctiveness of the upper and lower boundaries of the cork laminate section 194, because it is sandwiched between two distinctive layers in the floor plank 10, enables a consumer, or anyone else examining the edge portion of the floor plank, to see the structural presence and dimensional thickness of the cork laminate section 194, separate and apart from the other previously described layers above and below the cork laminate section 194.

Thus the ability of a consumer to have a precise sight of the cork laminate section 194 at an edge of the floor member can be used as an indicator or measure of quality of the floor plank 10.

A supplemental layer of woven fiberglass mesh having a thickness of less than 1 millimeter to 0.5 millimeters can be provided at a lower surface of the balance layer 196 to enhance the balancing function of the balance layer 196.

The first floor member portion 14 can also include a lower transfer layer laminate section 198 (FIG. 6), formed of a known plastic material, such as semi-rigid polyvinyl chloride, laminated, in any suitable known manner, to the balance layer laminate section 196. The lower transfer layer laminate section 198 helps prevent moisture from passing through the balance layer laminate section 196 to the cork laminate section 194.

The lower surface 64 (FIG. 3) of the first floor member portion 14 is also the lower surface of the transfer layer laminate section 198, and thus includes the downwardly directed adhesive surface 72.

The second floor member portion 16 includes a carrier layer 200 (FIG. 6) formed of a known plastic material, such as homogeneous polyvinyl chloride sheet material laminated in any suitable known manner to the first floor member portion 14 in the previously described offset relationship.

The carrier layer 200 can also be a foamed polyvinyl chloride layer formed in the manner of a cushioned vinyl sheet having medium hardness to a slightly stiffer hardness. A foamed pvc carrier layer 200 reduces the weight of the floor plank and increases its walking comfort, softness, sound insulation and warmth.

The upper surface 66 (FIG. 3) of the second floor member portion 16 is also the upper surface of the carrier layer 200 (FIG. 6), and thus includes the upwardly directed adhesive surface 74.

The structure and laminate configuration of a floor tile, although not shown, corresponds to the previously described structure and laminate configuration of the floor plank 10.

As various changes can be made in the above constructions and methods without departing from the scope of the invention, it is intended that all matter contained in the above description or shown in the accompanying drawings shall interpreted as illustrative and not in a limiting sense.

What is claimed is:

1. A floor member comprising,
   a) a first floor member portion having a first polygonal shape with at least two side edges, said first floor member portion having a substrate layer of flexible compressible composite cork sheet material with an upper surface, a top layer for walking upon formed of transparent plastic material provided over the upper surface of the composite cork sheet material and double flexible plastic underlayers provided between the top layer for walking upon and the upper surface of the composite cork sheet material to prevent the upper surface of the composite cork sheet material from dimpling through or telescoping through to the top layer for walking upon, the upper surface of the composite cork sheet material or one of the double flexible plastic underlayers being provided with a cork design pattern or wood design pattern visible through the top layer, said first floor member portion having a first lower surface,
   b) a second floor member portion of flexible plastic material having a second polygonal shape with at least two side edges, a second upper surface and a second lower surface,
   c) said first and second floor member portions being laminated together in offset relationship, and wherein the first lower surface of the first floor member portion contacts the second upper surface of the second floor member portion,
   d) the offset lamination of said first and second floor member portions defining a first offset marginal portion of said first floor member portion and a second offset marginal portion of said second floor member portion, said first marginal portion of said first floor member portion extending beyond at least one of the side edges of said second floor member portion, and said second marginal portion of said second floor member portion extending beyond at least one of the side edges of said first floor member portion,
   e) said first offset marginal portion having a first marginal lower surface that is part of the first lower surface of said first floor member portion, and said second offset marginal portion having a second marginal upper surface that is a part of the second upper surface of said second floor member portion, at least one of the first marginal lower surface and the second marginal upper surface having an exposed adhesive coating,
   f) the first and second floor member portions having respective predetermined thicknesses to enable the floor member to have a flexibility that permits the floor member to be bendable to facilitate assembly of the floor member into an assembly of floor members,
   g) the plastic material of said second floor member portion having a predetermined yieldability to surface irregularities of the floor base upon which the floor member is laid, such that said second floor member portion, when lying in flat contact on the floor base can conform to surface irregularities of the floor base.

2. The floor member as claimed in claim 1, in the form of a floor plank.

3. The floor member as claimed in claim 1, in the form of a floor tile.

4. The floor member as claimed in claim 1, wherein the first and second polygonal shapes are congruent rectangles, and the first offset marginal portion extends beyond two intersecting side edges of said second floor member portion such that said first offset marginal portion is L-shaped, and the second offset marginal portion extends beyond two intersecting side edges of said first floor member portion such that said second offset marginal portion is L-shaped.

5. The floor member as claimed in claim 1, wherein the wood design pattern resembles natural wood.

6. The floor member as claimed in claim 1, wherein the cork design pattern resembles natural cork.

7. The floor member as claimed in claim 1, wherein said first floor member portion includes a lower layer of transparent or dark colored plastic material below the layer of cork sheet material such that said layer of cork sheet material is between the transparent top layer, and the lower layer of transparent or dark colored plastic material.

8. The floor member as claimed in claim 7, wherein the layer of cork sheet material has a lower surface and an upper boundary that corresponds to the upper surface of said layer of cork sheet material, and a lower boundary that corresponds to the lower surface of said layer of cork sheet material, and the transparent top layer, and the lower layer of transparent or dark colored plastic material have edges that extend to an edge of the first floor member portion and provide a distinct sight at the edge of the first floor member portion of the upper and lower boundaries of the layer of cork sheet material that is between the top and lower layers of plastic material.

9. The floor member as claimed in claim 1, wherein said top layer of transparent plastic material for walking upon is embossed to provide to a relief pattern.

10. The floor member as claimed in claim 1, wherein both the first marginal lower surface and the second marginal upper surface have an exposed adhesive coating.

11. The floor member as claimed in claim 1, wherein the flexible plastic material of said second floor member portion is formed of a foamed plastic material.

12. The floor member as claimed in claim 11, wherein the foamed plastic material is a homogeneous polyvinyl chloride material.

13. The floor member as claimed in claim 1, wherein the flexible plastic material of said second floor member portion is formed of a non-foamed plastic sheet material.

14. The floor plank as claimed in claim 1, wherein the adhesive coating comprises a styrene-isoprene-styrene elastomer resin.

15. A method of preventing a substrate layer of cork material in a floor member from dimpling through or telescoping through to a top layer for walking upon comprising,
 a) providing a floor member having side edges with a first floor member portion having a substrate layer of compressible composite cork sheet material having an upper surface and a lower surface defining upper and lower surface boundaries of the layer of cork sheet material,
 b) providing the first floor member portion with a top layer of transparent plastic material for walking upon, over the layer of cork sheet material,
 c) providing the first floor member portion with double flexible plastic underlayers between the top layer for walking upon and the upper surface of the composite cork sheet material to prevent the upper surface of the composite cork sheet material from dimpling through or telescoping through to the top layer for walking upon,
 d) providing the first floor member portion with a lower layer of transparent or dark colored plastic material below the lower surface of the layer of composite cork sheet material, and
 e) laminating a second floor member portion in offset relationship from the first floor member portion and forming the second floor member portion of flexible plastic sheet material.

16. The method of claim 15, wherein the layer of compressible cork sheet material has an upper surface, the method further including printing a design pattern on the upper surface of the layer of compressible cork sheet material such that the design pattern is visible through the top layer for walking upon.

17. The method of claim 15, including printing a design pattern on one of the double flexible plastic underlayers or on the upper surface of the layer of compressible cork sheet material whereby the design pattern is visible through the top layer of transparent plastic material for walking upon.

18. The method of claim 15, including embossing the top layer to provide the top layer with a relief pattern.

19. The method of claim 15 including, providing the top layer of plastic material with a transparent edge that extends to at least one side edge of the floor member and providing the lower layer of plastic material with a transparent or dark colored edge that extends to the one side edge of the floor member to provide a distinct sight at the one side edge of the floor member of the upper and lower surface boundaries of the layer of cork sheet material that is between the top and lower layers of plastic material.

* * * * *